(12) United States Patent
Nakazaki et al.

(10) Patent No.: US 8,025,970 B2
(45) Date of Patent: Sep. 27, 2011

(54) FISHING LINE AND METHOD FOR PRODUCTION THEREOF

(75) Inventors: Junji Nakazaki, Iwakuni (JP); Manabu Hamamoto, Iwakuni (JP); Hidenobu Tsutsumi, Iwakuni (JP); Toshiaki Ihara, Usui-gun (JP); Ichiro Ono, Usui-gun (JP); Yoshio Fujiwara, Osaka (JP)

(73) Assignee: Sunline Co., Ltd., Iwakuni-Shi, Yamaguchi (JP)

( * ) Notice: Subject to any disclaimer, the term of this patent is extended or adjusted under 35 U.S.C. 154(b) by 462 days.

(21) Appl. No.: 11/665,447

(22) PCT Filed: Oct. 24, 2005

(86) PCT No.: PCT/JP2005/019486
§ 371 (c)(1),
(2), (4) Date: Apr. 16, 2007

(87) PCT Pub. No.: WO2006/046501
PCT Pub. Date: May 4, 2006

(65) Prior Publication Data
US 2008/0152908 A1 Jun. 26, 2008

(30) Foreign Application Priority Data
Oct. 25, 2004 (JP) .................. 2004-309462

(51) Int. Cl.
*B32B 27/34* (2006.01)
*D01D 5/08* (2006.01)
*C08F 283/00* (2006.01)
*B60C 1/00* (2006.01)

(52) U.S. Cl. ............... 428/395; 264/172.18; 525/419; 525/261; 525/269; 524/261

(58) Field of Classification Search .......... 428/364; 525/419, 261–269; 524/261
See application file for complete search history.

(56) References Cited

U.S. PATENT DOCUMENTS
6,080,489 A * 6/2000 Mehta ................ 428/447

FOREIGN PATENT DOCUMENTS

| JP | 60-188019 A | | 9/1985 |
|---|---|---|---|
| JP | 60-224885 A | | 11/1985 |
| JP | 2-269877 A | | 11/1990 |
| JP | 02269877 A | * | 11/1990 |
| JP | 4-4832 A | | 1/1992 |
| JP | 2004308020 A | * | 11/2004 |
| WO | WO 2004037926 A2 | * | 5/2004 |

OTHER PUBLICATIONS

Machine Translation of JP 2004308020 A (Nov. 2004).*

* cited by examiner

*Primary Examiner* — D. Lawrence Tarazano
*Assistant Examiner* — Ricardo E Lopez
(74) *Attorney, Agent, or Firm* — Buchanan Ingersoll & Rooney PC

(57) ABSTRACT

A fishing line is produced by forming a monofilament by subjecting a resin composition (C) containing 90 to 99.3% by weight of a polyamide resin (A) and 0.7 to 10% by weight of a silicone compound (B) having a number average molecular weight of 100,000 to 2,000,000 to melt-spinning and then drawing. This method can provide a fishing line which is excellent in abrasion resistance and also excellent in visibility. In this method, it is preferable to conduct melt-kneading of a part of the polyamide resin (A) with the silicone compound (B) in advance, adding of the residual polyamide resin (A) and further melt-kneading, subsequent melt-spinning, and drawing at a draw ratio of from 4 to 7.

5 Claims, 1 Drawing Sheet

FISHING LINE AND METHOD FOR PRODUCTION THEREOF

TECHNICAL FIELD

The present invention relates to fishing lines excellent in abrasion resistance and visibility, especially to fishing lines made up of a polyamide resin and a silicone compound, and also to methods for their production.

BACKGROUND ART

Heretofore, synthetic resins, such as polyamide resin, fluororesin, polyester resin and polyolefin resin, e.g. ultra high molecular weight polyethylene, are widely used as materials of fishing lines, in view of requirements with respect to processability and mechanical properties such as strength. In particular, polyamide resin is especially commonly used as a material of fishing lines because it is flexible and highly resistant to abrasion and also because highly visible lines can be obtained easily since it can be dyed easily.

Polyamide resin is a resin which is originally excellent in abrasion resistance. In use of a fishing line made of a polyamide resin, however, it has been impossible to prevent the fishing line from being damaged due to so-called sea floor abrasion or rock abrasion, which are abrasion with rocks or the like on the bottom of the water and there has been a risk of breakage of the line. Therefore, for fishing lines made of polyamide resin, further improvement in abrasion resistance is required.

As means for improving abrasion resistance, 1) a method of applying or fixing an abrasion resistance modifier to the surface of a fishing line fiber and 2) a method of mixing an abrasion resistance modifier in the raw material resin of fishing lines have been proposed.

As an example of the method 1), a fishing line made of nylon coated with a fluorine-containing resin is disclosed in Patent Document 1. It is reported to be excellent in slipping property, antifouling property and abrasion resistance. Patent Document 2 discloses a fishing line composed of a polyamide monofilament having a surface provided with amino-modified silicone oil. This is reported to be resistant to damage due to abrasion with rocks or the like. Both of the fishing lines, however, are not sufficient in adhesion between a coating layer and a polyamide resin and tend to suffer from delamination or falling off due to repeated use. In practical use in fishing, the effects often disappear only in short-time use, for example, almost one-day use. It therefore is difficult to say that the durability of abrasion resisting effect is sufficient.

As an example of the method 2), Patent Document 3 discloses a fishing line made of a monofilament obtained by mixing a modified resin composed of a fluorine-containing resin and/or an organic silicon-based resin with nylon resin and then molding. It is reported to be excellent in slipping property, antifouling property and abrasion resistance. In Examples of Patent Document 3, an example of incorporation of polydimethylsilicone as an organic silicon-based resin is disclosed. The incorporation amount thereof, however, is just 0.05 parts by weight per 100 parts by weight of the nylon resin. No description was made to the molecular weight of the silicone blended.

As disclosed in Patent Document 3, the method in which silicone is kneaded into a nylon monofilament can improve the durability of the effect of improving abrasion resistance more than the method in which silicone is coated on the surface. However, kneaded silicone having a number average molecular weight less than 100,000 tends to bleed out to the surface of fiber. Therefore, the durability of abrasion resisting effect is not sufficient yet. Moreover, silicone having a number average molecular weight less than 100,000 has low viscosities at high temperatures. Therefore, in the case of kneading and melt-spinning with a polyamide at a high temperature, increase in the addition amount thereof will cause variation in fiber diameter or breakage of strands, resulting in remarkable decrease in spinnability. It, therefore, is difficult to conduct stable production in an industrial scale. Furthermore, in the case of increasing the addition amount of the silicone having a number average molecular weight less than 100,000, mechanical properties, such as tensile strength and knot strength, are also deteriorated remarkably, and no fishing lines having strength sufficient enough for practical use have been obtained.

Patent Document 1: Japanese Unexamined Patent Publication No. 60-224885
Patent Document 2: Japanese Unexamined Patent Publication No. 4-4832
Patent Document 3: Japanese Unexamined Patent Publication No. 2-269877

DISCLOSURE OF THE INVENTION

Problems to be Solved by the Invention

The present invention was made in order to solve the problems mentioned above. An object of the present invention is to provide fishing lines excellent in abrasion resistance and also in visibility. Another object is to provide methods for producing fishing lines by which such fishing lines can be produced industrially and stably.

Means for Solving the Problems

The aforementioned problems are solved by providing a fishing line comprising a monofilament of a resin composition (C) containing 90 to 99.3% by weight of a polyamide resin (A) and 0.7 to 10% by weight of a silicone compound (B) having a number average molecular weight of 100,000 to 2,000,000 represented by the following formula (1):

[Chem. 1]

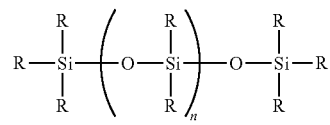

(1)

wherein R is a monovalent substituent and n is a natural number.

It is possible to obtain a fishing line excellent in abrasion resistance by incorporating a certain amount or more of the silicone compound (B) having a number average molecular weight of 100,000 to 2,000,000 to the polyamide resin (A). Since the silicone compound (B) is a compound having a high molecular weight, it is possible to conduct melt-spinning stably even if a certain amount or more of the silicone compound (B) is incorporated into the polyamide resin (A). A fishing line obtained in such a way is of a small variation in diameter and, therefore, is not so inferior in strength to fishing lines composed only of the polyamide resin (A). Moreover, since a certain amount or more of the silicone compound (B) may be incorporated, the internal diffused reflection originating in the refractive index difference between the both ingredients is remarkable and, therefore, the visibility of fishing lines is also improved greatly.

It is preferable that the polyamide resin (A) has a relative viscosity, as measured in a concentrated sulfuric acid solution, of 3 to 5. It is also preferable that the monofilament has an average diameter (Dav) of 0.05 to 3.5 mm and a diameter variation (Vd), as defined by the following formula (2), of 6% or less.

$$Vd=[(D\text{max}-D\text{min})/Dav]\times 100(\%) \quad (2)$$

wherein
Dmax is the maximum diameter of one monofilament,
Dmin is the minimum diameter of one monofilament, and
Dav is the average diameter of one monofilament.

In one of the preferred embodiments of the present invention, the monofilament is a conjugated fiber composed of the resin composition (C) and the polyamide resin (A), and the surface of the monofilament is covered with the resin composition (C).

The aforementioned objects can be solved also by providing a method for producing a fishing line, the method comprising melt-spinning a resin composition (C) containing 90 to 99.3% by weight of a polyamide resin (A) and 0.7 to 10% by weight of a silicone compound (B) having a number average molecular weight of 100,000 to 2,000,000 represented by the following formula (1) and then drawing it to obtain a monofilament:

[Chem. 2]

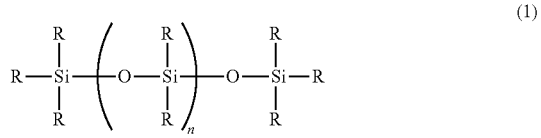

wherein R is a monovalent substituent and n is a natural number.

In this method, it is preferable that the method comprises melt-kneading of a part of the polyamide resin (A) with the silicone compound (B) in advance, adding of the residual polyamide resin (A) and further melt-kneading, and subsequent melt-spinning. It is also preferable that the drawing is conducted at a draw ratio of from 4 to 7.

Effect of the Invention

The fishing line of the present invention is excellent in abrasion resistance to abrasion on rocks and tree stumps and also is excellent in visibility. By use of the method for producing a fishing line of the present invention, it is possible to produce such a fishing line stably in an industrial scale.

EXPLANATION OF REFERENCE NUMERALS

Figure 1:
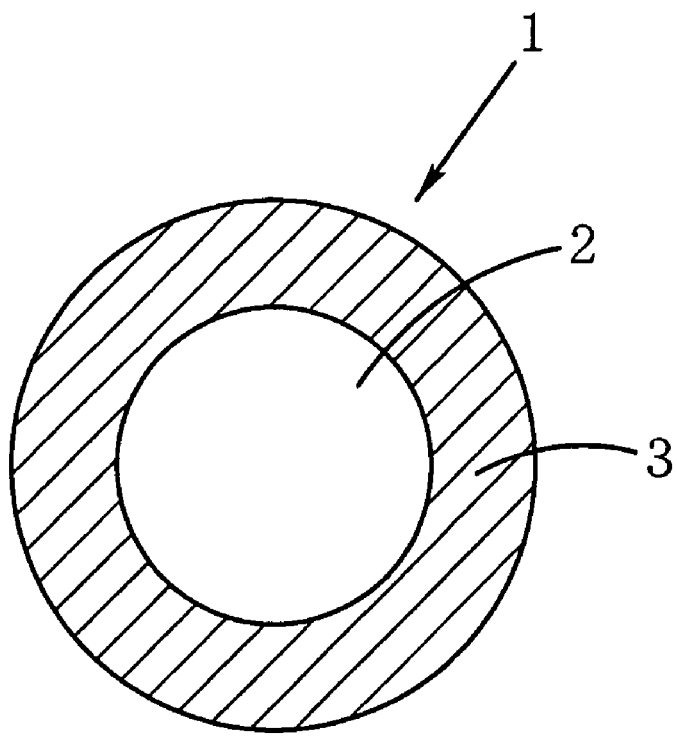
FIG. 1 A schematic diagram of a cross section of a core-sheath type conjugated monofilament.

1 Conjugated monofilament
2 Polyamide resin (A)
3 Resin composition (C)

BEST MODE for Carrying Out the Invention

The fishing line of the present invention is comprised of a monofilament of a resin composition (C) containing a polyamide resin (A) and a silicone compound (B). It is important that the base polymer of the resin composition (C) is the polyamide resin (A). The polyamide resin (A) is in wide use as fishing lines because of its excellent flexibility, abrasion resistance and formability. A fishing line composed of a fluorine-containing resin such as polyvinylidene fluoride sinks at a high speed in water because of its large specific gravity as great as 1.78 and it has a advantageous characteristic as a fishing line, that is, a characteristic of being not noticeable in water because of its refractive index of 1.42, which is close to the refractive index of water, namely, 1.33. However, such a fishing line is hard and a raw material thereof is expensive. Therefore, it is not suitable for use as a base polymer in the present invention. Fishing lines made of polyester, which have characteristics of having low coefficients of water absorption and having physical properties stable with time, can be used only as pre-assembled lines and the like for fishing applications because they have high elastic modulus and are hard. On the other hand, fishing lines made of high molecular weight polyethylene are produced by a method including spinning of polyethylene with a ultra-high molecular weight (about 600,000 or more) by the gel spinning method while highly orienting molecular chains. They, therefore, are not suitable for use as a base polymer of the present invention because incorporation of another ingredients such as a silicone compound will inhibit molecular orientation.

The polyamide resin (A) to be used in the present invention is not particularly restricted and examples thereof include: aliphatic polyamide homopolymers, such as polycaproamide (nylon-6), polyundecanamide (nylon-11), polylauryl lactam (nylon-12), polyhexamethylene adipamide (nylon-6,6), polyhexamethylene sebacamide (nylon-6,10) and polyhexamethylene dodecamide (nylon-6,12); aliphatic polyamide copolymers, such as caprolactam/lauryllactam copolymer (nylon-6/12), caprolactam/aminoundecanoic acid copolymer (nylon-6/11), caprolactam/ω-aminononanoic acid copolymer (nylon-6/9), caprolactam/hexamethylene diammonium adipate copolymer (nylon-6/6, 6) and caprolactam/hexamethylene diammonium adipate/hexamethylene diammonium sebacate copolymer (nylon-6/6,6/6,12); and aromatic polyamides, such as hexamethylene diammonium terephthalate/hexamethylene diammonium isophthalate copolymer (nylon-6T/6I). Such polyamide resins may be used either singly or as a mixture of two or more species.

Among such polyamide resins, ones including a caproamide component (for example, nylon-6, nylon-6,12, nylon-6/10, nylon-6/12 and nylon-6/6,6) are preferred because they are supplied stably in an industrial scale and, in the cost aspect, inexpensive products can be obtained easily. In particular, copolymerized polyamide resins including a caproamide component (for example, nylon-6/10, nylon-6/12 and nylon-6/6,6) are more preferred because they have low crystallinity and will improve flexibility.

It is preferable that the polyamide resin (A) has a relative viscosity, as measured in a concentrated sulfuric acid solution, of 3 to 5. Monofilaments for fishing lines are usually produced by extrusion and are required to be of high strength. Therefore, their relative viscosities are preferably 3 or more, and more preferably 3.3 or more. On the other hand, cases where the relative viscosity is higher than 5 are undesirable because melt-formability may be poor. Particularly in the present invention, a certain amount or more of a silicone compound (B) is incorporated to a polyamide resin (A). It, therefore, may be difficult to conduct melt-spinning stably if the relative viscosity of the polyamide resin (A) is too high. The relative viscosity is more preferably 4 or lower.

The silicone compound (B) used in the present invention is represented by the following formula (1):

[Chem. 3]

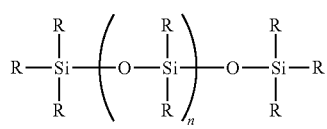
(1)

In the above formula (1), R is only required to be a monovalent substituent and is not particularly restricted. n is a natural number and shows the number of repeating units. Here, all of the Rs may be either the same or different. Rs may be linked together to form a ring. Examples of ones preferred as R include hydrocarbon groups having 1 to 12 carbons. Examples of such hydrocarbon groups having 1 to 12 carbons include alkyl groups such as methyl group, ethyl group, propyl group and butyl group; cycloalkyl groups such as cyclohexyl group; aryl groups such as phenyl group; and unsaturated hydrocarbon groups such as vinyl group. In particular, it is preferable that Rs are methyl groups. It is preferable that 80% or more of all the Rs are methyl groups and particularly preferable that substantially all the Rs are methyl groups. n, which may vary depending on the type of Rs, is approximately from 1,350 to 27,000 when substantially all the Rs are methyl groups.

It is important that the number average molecular weight of the silicone compound (B) used in the present invention is from 100,000 to 2,000,000. Use of such a high molecular weight silicone compound (B) in a certain amount remarkably improves the abrasion resistance of resulting fishing lines. The form in room temperature of the silicone compound (B) is not oil but, usually, solid with elasticity. When it has no fluidity at room temperature, it becomes possible to inhibit the compound from bleeding out from a monofilament and to inhibit from leaving from the surface of a monofilament. Thus, it becomes possible to maintain the abrasion resistance for a long period of time.

When a silicone compound has a number average molecular weight less than 100,000, it will have too low a viscosity at high temperatures. It, therefore, is difficult to disperse it uniformly in monofilaments when melt-kneading it with a polyamide resin (A). In addition, the discharge of a polymer will become uneven with time during melt-spinning. This will cause a great variation in diameter of monofilaments and will make it difficult to produce monofilaments stably in an industrial scale. Moreover, resulting monofilaments easily have insufficient abrasion resistance. The number average molecular weight of the silicone compound (B) is preferably 200,000 or more, and more preferably 300,000 or more. On the other hand, if a silicone compound has a number average molecular weight greater than 2,000,000, it will become difficult to melt-knead it with a polyamide resin (A) and, therefore, the dispersibility in monofilaments will become poor. The number average molecular weight of the silicone compound (B) is preferably 1,500,000 or less, and more preferably 1,000,000 or less. Regarding the silicone compound (B), one sort thereof may be used singly or, alternatively, two or more sorts thereof may be used in combination.

The resin composition (C) constituting the fishing line of the present invention contains 90 to 99.3% by weight of a polyamide resin (A) and 0.7 to 10% by weight of a silicone compound (B). Inclusion of 0.7% by weight or more of the silicone compound (B) makes it possible to obtain a fishing line excellent in abrasion resistance. When a silicone compound having a number average molecular weight less than 100,000 is used and 0.7% by weight or more of the silicone compound is incorporated, resulting monofilaments may be uneven in fiber diameter or great decrease in spinnability may be caused due to occurrence of filament breakage. Thus, it is difficult to produce monofilaments stably in an industrial scale. In such cases, mechanical properties, such as tensile strength and knot strength, are greatly deteriorated and therefore it is also difficult to obtain fishing lines strong enough for practical use. In contrast, by use of a silicone compound (B) having a number average molecular weight of 100,000 or more as in the present invention, it is possible to obtain monofilaments of good quality stably even it is incorporated in an amount of 0.7% by weight or more. Since a certain amount or more of the silicone compound (B) can be uniformly dispersed and incorporated in the polyamide resin (A), the internal diffused reflection originating in the refractive index difference between the both ingredients is great and, therefore, resulting fishing lines will have good visibility.

The content of the silicone compound (B) is preferably 1.5% by weight or more, and more preferably 3% by weight or more. The content of the polyamide resin (A) is preferably 98.5% by weight or less, and more preferably 97% by weight or less. On the other hand, if the content of the silicone compound (B) is over 10% by weight, polymer flows discharged through spinning nozzles will not be stabilized and, therefore, the discharge rate will vary from nozzle to nozzle or the discharge rate at a single nozzle hole will vary with time. As a result, strands will often break and it will become difficult to conduct stable production. The content of the silicone compound (B) is preferably 7% by weight or less. In this case, the content of the polyamide resin (A) is preferably 93% by weight or more.

A monofilament is formed by melt-spinning using the aforementioned polyamide resin (A) and silicone compound (B). In the melt-spinning, the polyamide resin (A) and the silicone compound (B) may be directly spun while being charged into a molding machine. It, however, is preferable to conduct melt-kneading of a part of the polyamide resin (A) with the silicone compound (B) in advance, adding of the residual polyamide resin (A) and further melt-kneading, and subsequent melt-spinning. By use of this method, it is possible to disperse the polyamide resin (A) and the silicone compound (B) well. Specifically, a method is provided as an example in which a predetermined amount of a silicone compound (B) is mixed with a polyamide resin (A), followed by pelletization, and the resultant are used as master pellets, which are then diluted with an additional portion of the polyamide resin by dry blend, followed by spinning. Preferable examples of the method of melt-spinning a part of a polyamide resin (A) and a silicone compound (B) include melt-kneading and pelletizing both ingredients by use of a kneading machine having a high kneading effect, such as a twin screw extruder, a single screw extruder or a kneader. A resin composition prepared by melt-kneading in advance in such a manner preferably include 30 to 90% by weight of the polyamide resin (A) and 10 to 70% by weight of the silicone compound (B).

The temperature of spinning through a nozzle at the time of spinning is not particularly limited if it is a temperature at which a polyamide resin (A) can be melt-spun, but it is preferably from 230 to 290° C. In order to satisfy a strength required as fishing lines, a polyamide resin (A) having a relatively high viscosity is used. Therefore, in order to achieve good melt-spinnability, the spinning temperature is preferably 230° C. or higher, more preferably 250° C. or higher, and even more preferably 260° C. or higher. On the other hand, if the spinning temperature is too high, there is a possibility that the dispersibility of a polyamide resin (A) and a silicone compound (B) may worsen and the strength may decrease. Therefore, the spinning temperature is preferably 290° C. or lower, and more preferably 280° C. or lower.

A monofilament which has been spun is cooled and then drawn. The drawing temperature is preferably from 90 to 120° C., and more preferably from 95 to 105° C. The drawing ratio is preferably from 4 to 7, more preferably from 5 to 6.8, and even more preferably from 5.7 to 6.2. When the drawing is conducted, the drawing may be conducted at one stroke to a desired drawing ratio. In order to stably draw a resin composition (C) including both a polyamide resin (A) and a silicone compound (B), however, drawing is preferably conducted in multiple stages. In such a case, it is preferable that the drawing temperature of the second drawing is set higher than that of the first drawing and that the drawing ratio of the second drawing is set smaller than that of the first drawing. It is also preferable to conduct a relaxing heat treatment subsequent to the drawing operation.

Instead of forming a monofilament composed only of a resin composition (C) of a polyamide resin (A) and a silicone compound (B), it is permissible to form a conjugated fiber constituted of a resin composition (C) and a polyamide resin (A). Such a conjugated fiber is obtained by melting a resin composition (C) and a polyamide resin (A) separately, and then conducting conjugate spinning. This makes it possible to minimize the decrease in strength while improving the abrasion resistance and also to reduce the raw material cost. In this case, in view of improvement of abrasion resistance, it is preferable that the surface of the monofilament is covered with the resin composition (C). The conjugate ratio (resin composition (C)/polyamide resin (A)), in volume, is preferably from 10/90 to 90/10, more preferably from 20/80 to 80/20, and even more preferably from 30/70 to 70/30. If the proportion of the resin composition (C) is too small, it may be difficult to uniformly cover the surface of a fiber with a silicone-containing component stably in production, while depending on the diameter of a fishing line to be produced.

Figure 2:
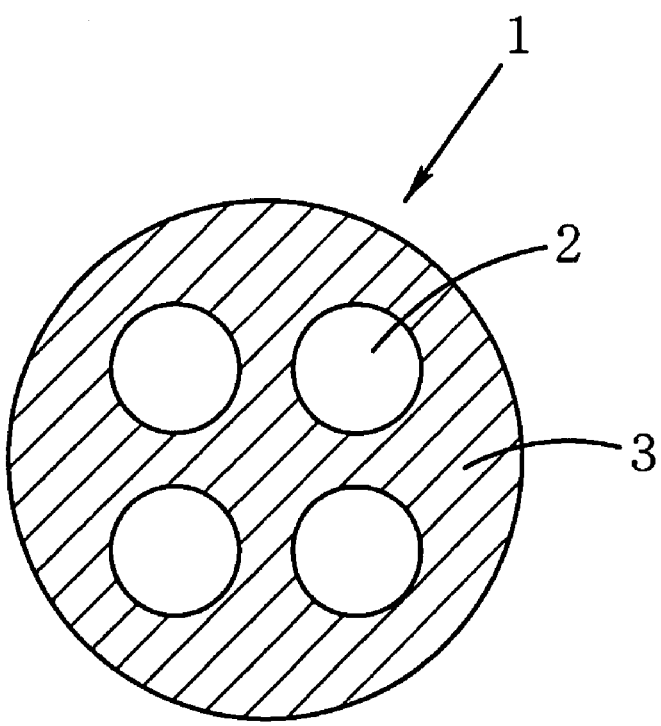
FIG. 2 A schematic diagram of a cross section of a multi-core type conjugated monofilament.

In the above-mentioned conjugated fiber, its cross-sectional structure is important. That is, in order for the effect of abrasion resistance to be developed, it is important to form a cross-sectional structure such that the resin composition (C) covers the surface of the fiber completely. Examples of such structure include a core-sheath type as shown in FIG. 1 and a multicore type as shown in FIG. 2. In particular, a core-sheath type conjugated fiber is preferred because of ease in its production and the like. Fishing lines having parts where a polyamide resin (A) is exposed on the surface of a monofilament are not preferred because the exposed parts will be damaged due to see floor abrasion or rock abrasion and such damaged parts will become breakage starting points and eventually result in line breakage.

The diameter of a resulting monofilament is preferably from 0.05 to 3.5 mm, and more preferably from 0.1 to 1 mm. The profile of the cross-section of the monofilament, which is not particularly restricted, is typically circular. Any known modified shapes other than a circular shape can be used if the modification is within a degree such that troubles, such as accumulation of twists and easy occurrence of curling, are not caused during use as a fishing line.

The tensile strength of the fishing line of the present invention is preferably from 7 to 11 cN/dTex and the elongation percentage corresponding thereto is preferably from 23 to 35%. Although the fishing line of the present invention includes a certain amount or more of a silicone compound (B), decrease in strength thereof is limited to be slighter than that in fishing lines composed only of a polyamide resin (A). Therefore, the fishing line of the present invention has a strength high enough for practical use. Moreover, the tensile elongation is almost the same as that of fishing lines composed only of a polyamide resin (A). The knot strength of the fishing line of the present invention is preferably from 5 to 10 cN/dTex and the elongation percentage corresponding thereto is preferably from 13 to 25%. Moreover, the knot strength and the knot elongation are almost the same as those of fishing lines composed only of a polyamide resin (A).

The fishing line of the present invention has an abrasion resistance remarkably improved in comparison to fishing lines composed only of a polyamide resin (A). Explanation is made using a value of abrasion resistance at break, which is explained in the Examples provided below. The value of abrasion resistance at break of the fishing line of the present invention can be at least 1.3 times or greater, or even at least 1.5 times or greater than that of fishing lines composed only of a polyamide resin (A). In contrast, in cases where a silicone compound having a molecular weight less than 100,000 is incorporated, a remarkable improvement in abrasion resistance cannot be expected because it is difficult to incorporate a large amount of such a silicone compound.

It is preferable that the monofilament constituting the fishing line of the present invention has an average diameter (Dav) of 0.05 to 3.5 mm and a diameter variation (Vd), as defined by the following formula (2), of 6% or less.

$$Vd=[(Dmax-Dmin)/Dav]\times 100(\%) \qquad (2)$$

wherein
Dmax is the maximum diameter of one monofilament,
Dmin is the minimum diameter of one monofilament, and
Dav is the average diameter of one monofilament.

Here, the measurement of the diameter of a monofilament is performed by sampling and measuring diameters at equal intervals throughout the monofilament. The measurement is carried out at 20 or more points. When the diameter variation (Vd) is too large, the strength may decrease and variation in elongation percentage will become noticeable. This may result in serious defects from the viewpoint of blunting of bite sensitivity in fishing. The diameter variation (Vd) is more preferably 5% or less.

The fishing line of the present invention has good visibility. Since the fishing line of the present invention includes a certain amount or more of the silicone resin (B), the visibility is improved due to reflection in the interface between the polyamide resin (A) and the silicone compound (B). Since it is possible to disperse both ingredients finely and uniformly in a monofilament, the monofilament exhibits pearl tone with an upscale appearance.

As described above, the fishing line of the present invention is excellent in abrasion resistance and is also excellent in visibility. Taking advantage of such properties, it can be used as fishing lines for various applications. For example, it can be used suitably for surf fishing using a float-free fishing in the surf zone, basket fishing, bass fishing, trout fishing, saltwater lure fishing, and the like.

EXAMPLES

The present invention is described concretely below with reference to examples. Testing methods used in the Examples are as follows:

(1) Relative Viscosity of Polyamide Resin (A)

A polyamide resin (A) as a sample was dissolved in 96% by weight of concentrated sulfuric acid to a polymer concentration of 1 g/100 mL and measurement was conducted at 25° C.

(2) Number Average Molecular Weight of Silicone Compound (B)

The number average molecular weight of a silicone compound (B) as a sample, calibrated with standard polystyrene, was determined by gel permeation chromatography (GPC).

(3) Fiber Diameter

Using a digital indicator made by Mitutoyo Corp. "ID-112BS", fiber diameters of a monofilament with a sample length of 20 m were measured at 20 points at equal intervals. From the values of fiber diameters obtained, the diameter variation (Vd) was calculated according to the following formula (2):

$$Vd = [(Dmax - Dmin)/Dav] \times 100(\%) \quad (2)$$

wherein

Dmax is the maximum diameter of one monofilament,

Dmin is the minimum diameter of one monofilament, and

Dav is the average diameter of one monofilament.

(4) Tensile Strength and Elongation

Using an autograph "AGS-1kNG" made by Shimadzu Corp., 10 samples were measured at a test length of 20 cm and a tensile rate of 30 cm/min. From the average values, a tensile strength (cN/dTex) and a tensile elongation (%) were calculated.

(5) Knot Strength and Elongation

A knot part of sample monofilaments was formed by the method described in Section 7.6 of JIS L1013 (1992). Using an autograph "AGS-1kNG" made by Shimadzu Corp., 10 samples were measured at a test length of 20 cm and a tensile rate of 30 cm/min. From the average values, a knot strength (cN/dTex) and a knot elongation (%) were calculated.

(6) Value of Abrasion Resistance at Break

The abrasion resistance was evaluated by an abrasion resistance test in water at room temperature according to the disclosure of Japanese Unexamined Patent Publication No. 2001-208663. That is, one end of a strand having a test length of 110 cm was fixed to a strand-fixing jig. To the other end, a load of 9 kg/mm$^2$ per cross-sectional area of the strand was applied. The strand was traveled reciprocally on an abrasive body, namely, a rough grindstone 20 mm in diameter (WA abrasive grains #60) placed in water at room temperature through movement of the strand-fixing jig and the number of reciprocal strokes before breakage of the strand was counted. The test conditions include: contact angle with the abrasive body: 90°, the reciprocation rate of the strand: 90 times/min, and reciprocal stroke distance: 17 cm. In order to avoid a strand from traveling continuously on the same position, the abrasive body was moved for a reciprocal distance of 20 mm, reciprocally at a rate of 2 reciprocations/min in a direction perpendicular to the strand traveling. The number of reciprocal strokes before breakage of the strand, which is called the value of abrasive resistance at break, was measured five times for each sample and the average thereof was calculated.

Example 1

As a polyamide resin (A), pellets composed of a copolymerized polyamide resin having a copolymerization ratio (6/6,6:molar ratio) of nylon-6 to nylon-6,6 of 85/15 were used. The relative viscosity of the copolymerized polyamide resin, as measured in a concentrated sulfuric acid solution, is 3.4. As a silicone compound (B), a polydimethylsiloxane having a number average molecular weight of 500,000 was used.

60 parts by weight of the polyamide resin (A) and 40 parts by weight of the silicone compound (B) were melt-kneaded with a twin screw extruder and then cut. Thus, master pellets including 40% by weight of the silicone compound (B) were obtained.

After dry blending of 90 parts by weight of pellets of the polyamide resin (A) and 10 parts by weight of the master pellets was conducted so that the concentration of the silicone compound (B) in a monofilament might become 4% by weight, the resulting blend was charged into a single screw extruder having a cylinder diameter of 30 mm. The blend was subjected to melt-kneading in the extruder and then was spun at a temperature of 270° C. through a 10-holed spinneret having a diameter of 1.6 mm and an L/D of 2. The spun fibers were subjected to cooling in a water bath at 25° C., then to drawing at a ratio of 3.4 in a steam heating chamber at 100° C. and, subsequently, at a ratio of 1.7 in a dry heating chamber at 185° C. (a total ratio of 5.8), and then to 4% relaxing heat treatment in a dry heating chamber at 185° C. Subsequently, the fibers were wound up at a rate of 100 mm/min. Thus, monofilaments having diameter of 0.240 mm were produced. The concentration of the silicone compound (B) in the resulting monofilaments was 4% by weight. The spinnability in the operations was good. For the monofilaments obtained, the diameter variation (Vd), tensile strength and elongation, knot strength and elongation and value of abrasion resistance at break were evaluated according to the methods previously described. The evaluation results are shown collectively in Table 1.

Examples 2, 3 and Comparative Example 1

Monofilaments were obtained in the same manner as in Example 1 except changing, in Example 1, the dry blend ratio of the pellets of the polyamide resin (A) to the master pellets so that the concentration of the silicone compound (B) in the resulting monofilaments might become 1% by weight (Example 2), 0.8% by weight (Example 3), and 15% by weight (Comparative Example 1).

In the cases where the concentration of the silicone compound (B) is 1% by weight (Example 2) and 0.8% by weight (Example 3), the spinnability was good. The resulting monofilaments were evaluated in the same manner as in Example 1 and the results are shown in Table 1. When the concentration of the silicone compound (B) was 15% by weight (Comparative Example 1), the polymer discharge through the nozzle holes of the spinneret was unstable and nodular materials were found in the spun strands. Moreover, breakage of strands occurred so frequently that the spinnability was poor. The diameter variation (Vd) of the resulting strands was so large as 13.4% that other evaluations were not performed.

Comparative Examples 2, 3

A copolymerized polyamide, which is the same as that of Example 1, was used as a polyamide resin (A). A polydimethylsiloxane having a number average molecular weight of 90,000 was used as a silicone compound (B). 80 parts by weight of the polyamide resin (A) and 20 parts by weight of the silicone compound (B) were melt-kneaded and then cut in the same manner as in Example 1. Thus, master pellets including 20% by weight of the silicone compound (B) were obtained. Monofilaments were produced in the same manner as in Example 1 by dry blending the pellets of the polyamide resin (A) and the master pellets so that the concentration of the silicone compound (B) in resulting monofilaments might become 0.8% by weight (Comparative Example 2) and 4.0% by weight (Comparative Example 3).

When the concentration of the silicone compound (B) was 0.8% by weight (Comparative Example 2), there was a large variation in fiber diameter and breakage of strands sometimes occurred. Thus, the spinnability was poor. The resulting monofilaments were evaluated in the same manner as in Example 1 and the results are shown in Table 1. When the concentration of the silicone compound (B) was 4.0% by weight (Comparative Example 3), the variation in fiber diameter became poorer, the nozzle holes were heavily polluted, and moreover breakage of strands occurred frequently. Thus, the spinnability was extremely poor. The diameter variation (Vd) of the resulting strands was so large as 12.4% that other evaluations were not performed.

Comparative Example 4

A copolymerized polyamide, which is the same as that of Example 1, was used as a polyamide resin (A). A polydimethylsiloxane having a number average molecular weight of 2,500,000 was used as a silicone compound (B). 80 parts by weight of the polyamide resin (A) and 20 parts by weight of the silicone compound (B) were melt-kneaded and then cut in the same manner as in Example 1. Thus, master pellets including 20% by weight of the silicone compound (B) were obtained. Monofilaments were produced in the same manner as in Example 1 by dry blending the pellets of the polyamide resin (A) and the master pellets so that the concentration of the silicone compound (B) in resulting monofilaments might become 0.5% by weight. Regarding the spinnability in this operation, however, the polymer discharge through the nozzle holes of the spinneret was unstable and many nodular materials were found in the spun strands. Moreover, breakage of strands occurred so frequently that the spinnability was extremely poor. The diameter variation (Vd) of the resulting strands was so large as 18.5% that other evaluations were not performed.

Comparative Example 5

Monofilaments containing no silicone compound (B) were produced in the same manner as in Example 1 except spinning was conducted using only a polyamide resin (A) instead of using the mixture of the polyamide resin (A) and the master chips in Example 1. The spinnability in the operations was good. The resulting monofilaments were evaluated in the same manner as in Example 1 and the results are shown in Table 1.

Example 4

A copolymerized polyamide, which is the same as that of Example 1, was used as a polyamide resin (A). A polydimethylsiloxane having a number average molecular weight of 500,000, which is the same as that of Example 1, was used as a silicone compound (B). 93 parts by weight of the polyamide resin (A) and 7 parts by weight of the silicone compound (B) were melt-kneaded and then cut in the same manner as in Example 1. Thus, pellets of resin composition (C) including 7% by weight of the silicone compound (B) were obtained. Conjugate spinning in a core-sheath type was conducted using the polyamide resin (A) as the core component and the pellets of the resin composition (C) as the sheath component. The conjugate ratio, in volume, of the components (resin composition (C)/polyamide resin (A)) in this operation is 1/1. To two single screw extruders each having a cylinder diameter of 30 mm, the resin composition (C) and the polyamide resin (A) were charged, respectively, and then were spun at a temperature of 270° C. through a 10-holed spinneret having a diameter of 1.6 mm and an L/D of 2. The spun fibers were subjected to cooling in a water bath at 25° C., then to drawing at a ratio of 3.4 in a steam heating chamber at 100° C. and, subsequently, at a ratio of 1.7 in a dry heating chamber at 185° C. (a total ratio of 5.8), and then to 4% relaxing heat treatment in a dry heating chamber at 185° C. Subsequently, the fibers were wound up at a rate of 100 mm/min. Thus, conjugated monofilaments having diameter of 0.240 mm were produced. The spinnability in the operations was good. The resulting monofilaments were evaluated in the same manner as in Example 1 and the results are shown in Table 1.

TABLE 1

| | Silicone compound (B) | | | | | | | Value of |
|---|---|---|---|---|---|---|---|---|
| | Number average molecular weight | Content (% by weight) | Diameter variation (%) | Tensile strength (cN/dTex) | Tensile elongation (%) | Knot strength (cN/dTex) | Knot elongation (%) | abrasion resistance at break (times) |
| Example 1 | 500000 | 4.0 | 4.2 | 8.3 | 24.9 | 5.9 | 14.7 | 126 |
| Example 2 | 500000 | 1.0 | 4.2 | 8.1 | 25.4 | 6.8 | 18.7 | 100 |
| Example 3 | 500000 | 0.8 | 4.8 | 7.7 | 26.9 | 6.7 | 22.7 | 85 |
| Example 4 | 500000 | 7.0*[1] | 4.0 | 8.5 | 24.3 | 6.2 | 15.0 | 137 |
| Comparative Example 1 | 500000 | 15.0 | 13.4 | — | — | — | — | — |
| Comparative Example 2 | 90000 | 0.8 | 6.3 | 7.8 | 27.4 | 7.0 | 21.3 | 84 |
| Comparative Example 3 | 90000 | 4.0 | 12.4 | — | — | — | — | — |
| Comparative Example 4 | 2500000 | 0.5 | 18.5 | — | — | — | — | — |
| Comparative Example 5 | — | 0 | 5.9 | 9.0 | 25.4 | 5.2 | 15.1 | 65 |

*[1])Conjugated fiber containing a resin composition (C) including 7% by weight of a silicone compound (B) and a polyamide resin (A).

As shown in Table 1, in Examples 1 to 3, where 0.7 to 10% by weight of a silicone compound (B) having a number average molecular weight of 100,000 to 2,000,000 was incorporated to a polyamide resin (A), abrasion resistance was remarkably improved, diameter variation was better and decrease in strength was limited to be slighter in comparison to Comparative Example 5, where no silicone compound (B) was incorporated. In Comparative Example 1, where the amount of the silicone compound (B) incorporated was over 10% by weight, spinnability was greatly deteriorated. In the cases where a silicone compound having a molecular weight less than 100,000 was incorporated, the diameter variation increased when the amount of the compound incorporated was 0.8% by weight (Comparative Example 2), whereas the spinnability was greatly deteriorated when the amount of the compound incorporated was increased to 4.0% by weight (Comparative Example 3). That is, when the molecular weight of a silicone compound was low, it was difficult to incorporate a certain amount or more of a silicone compound and no fishing lines having a small diameter variation and being excellent in abrasion resistance were obtained. As shown in Comparative Example 4, when a silicone compound having a molecular weight over 2,000,000 was incorporated, spinnability was greatly deteriorated. As shown in Example 4, it was possible to develop the effect of the present invention also when a conjugated fiber was used.

The invention claimed is:

1. A fishing line comprising a monofilament of a resin composition (C) containing 90 to 99.3% by weight of a polyamide resin (A) having a relative viscosity, as measured in a concentrated sulfuric acid solution, of 3.3 to 5 and 0.7 to 10% by weight of a polydimethylsiloxane having a number average molecular weight of 300,000 to 2,000,000 represented by the following formula (1):

[Chem. 1]

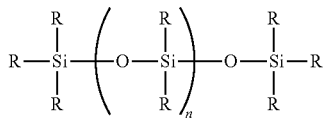

(1)

wherein substantially all the Rs are methyl groups and n is a natural number, wherein the polyamide resin (A) is a copolymerized polyamide resin including a caproamide component, wherein a tensile strength of the fishing line is from 7 to 11 cN/dTex, wherein a knot strength of the fishing line is from 5 to 10 cN/dTex, and wherein the monofilament has an average diameter (Dav) of 0.05 to 3.5 mm and a diameter variation (Vd), as defined by the following formula (2), of 6% or less;

$$Vd=[(D\text{max}-D\text{min})/D\text{av}]\times 100(\%) \quad (2)$$

wherein

Dmax is the maximum diameter of one monofilament,

Dmin is the minimum diameter of one monofilament, and

Dav is the average diameter of one monofilament.

2. The fishing line according to claim 1, wherein the monofilament is a conjugated fiber composed of the resin composition (C) and the polyamide resin (A), and the surface of the monofilament is covered with the resin composition (C).

3. A method for producing a fishing line, the method comprising melt-spinning a resin composition (C) containing 90 to 99.3% by weight of a polyamide resin (A) having a relative viscosity, as measured in a concentrated sulfuric acid solution, of 3.3 to 5 and 0.7 to 10% by weight of a polydimethylsiloxane having a number average molecular weight of 300,000 to 2,000,000 represented by the following formula (1) and then drawing it to obtain a monofilament:

[Chem. 2]

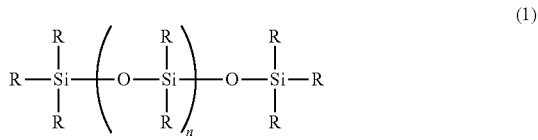

(1)

wherein substantially all the Rs are methyl groups and n is a natural number, wherein the polyamide resin (A) is a copolymerized polyamide resin including a caproamide component, wherein a tensile strength of the fishing line is from 7 to 11 cN/dTex, wherein a knot strength of the fishing line is from 5 to 10 cN/dTex, and wherein the monofilament has an average diameter (Dav) of 0.05 to 3.5 mm and a diameter variation (Vd), as defined by the following formula (2), of 6% or less;

$$Vd=[(D\text{max}-D\text{min})/D\text{av}]\times 100(\%) \quad (2)$$

wherein

Dmax is the maximum diameter of one monofilament,

Dmin is the minimum diameter of one monofilament, and

Dav is the average diameter of one monofilament.

4. The method for producing a fishing line according to claim 3, wherein the method comprises melt-kneading of a part of the polyamide resin (A) with the polydimethylsiloxane in advance, adding of the residual polyamide resin (A) and further melt-kneading, and subsequent melt-spinning.

5. The method for producing a fishing line according to claim 3, wherein the drawing is conducted at a draw ratio of from 4 to 7.

* * * * *